C. H. GRAESSER AND E. B. CROCKER.
RETAINING DEVICE FOR GAGE CASES.
APPLICATION FILED APR. 2, 1920.

1,398,373.

Patented Nov. 29, 1921.

Inventor
Carl H. Graesser
and Ernest B. Crocker
BY
Samuel E. Darby
ATTORNEY

UNITED STATES PATENT OFFICE.

CARL H. GRAESSER, OF FAIRFIELD, AND ERNEST B. CROCKER, OF STRATFORD, CONNECTICUT, ASSIGNORS TO MANNING, MAXWELL & MOORE, INC., OF NEW YORK, N. Y., A CORPORATION OF NEW JERSEY.

RETAINING DEVICE FOR GAGE-CASES.

1,398,373.     Specification of Letters Patent.     Patented Nov. 29, 1921.

Application filed April 2, 1920. Serial No. 370,752.

*To all whom it may concern:*

Be it known that we, CARL H. GRAESSER and ERNEST B. CROCKER, both citizens of the United States, and residents, respectively, of Fairfield and Stratford, in the county of Fairfield and State of Connecticut, have made a certain new and useful Invention in Retaining Devices for Gage-Cases, of which the following is a specification.

This invention relates to devices for retaining gage cases in position upon a supporting board or plate.

The object of the invention is to provide retaining devices for gage cases to secure the same in place when mounted upon an instrument board, and which is simple in structure, economical to manufacture, easy to apply and efficient for the purposes desired.

A further object is to provide the gage case with a strap having shouldered free spring ends designed to engage beneath the edge of the aperture in an instrument board when the gage case is mounted in place therein, to retain the gage case in its mounted position.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawings:—

Figure 1:
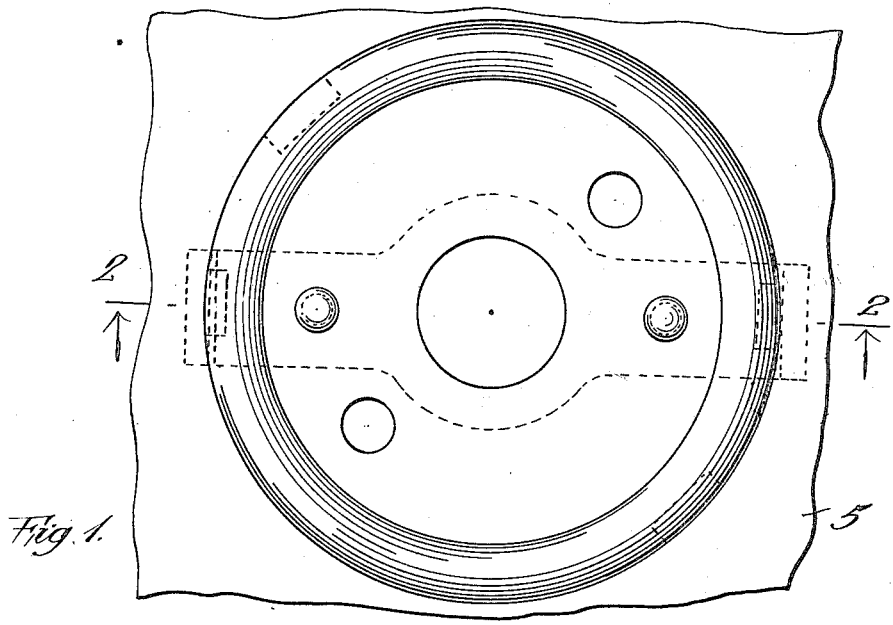
Figure 1 is a view in plan of a portion of an instrument board showing the application thereto of a gage case and retaining devices therefor embodying the principles of our invention.
Figure 2:
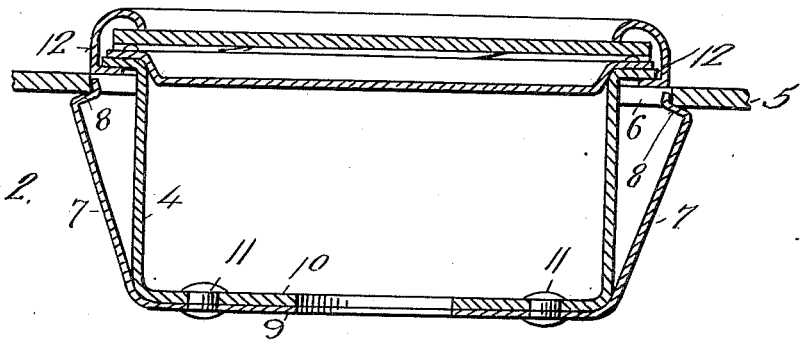
Fig. 2 is a central sectional view of the same on the line 2, 2, Fig. 1, looking in the direction of the arrows.
Figure 3:
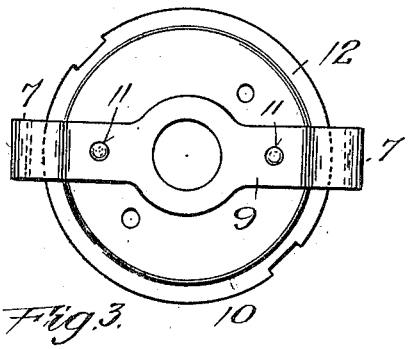
Fig. 3 is a view in bottom plan of a gage case showing the application thereto of a retaining spring strap embodying our invention.

It is a common practice to mount gages upon a supporting or instrument board by providing the board with an aperture through which the body of gage case is inserted, so as to disclose only the cap and face of the gage. This is especially the practice in mounting gages and other devices on the instrument board of automobiles.

It is among the special purposes of our present invention to provide means which are simple and effective for retaining the gage or other instrument case or body in place when mounted upon an instrument board in the manner above referred to, and in attaining our purpose we employ a strap which is secured across the base end of the case with its free ends bent outwardly toward the visible face of the instrument and formed with shoulders. These free ends of the strap form springs which fold or compress against the side of the casing of the instrument when the body thereof is inserted through the apertures of the instrument board in which it is to be mounted, and which spring outwardly away from the instrument body when the shoulders thereon pass the inner edge of the aperture, and engage against the inner boundary wall of such aperture, thereby securing and locking the instrument body in place.

In the drawing, reference numeral 4 designates the body or case of a gage or other instrument, and 5 a board or support in which the instrument is to be mounted. This board is formed with an aperture 6 through which the body 4 of the instrument is inserted in mounting the instrument in the board. Suitably secured to the body or case 4 are spring arms 7, which are disposed alongside the body or case and extend toward the front or visible end or face of the case from the direction of its inner end wall. These spring arms are of a length somewhat less than the depth of the case and are formed with shoulders 8, at their outer free ends. When the instrument case with the spring arms applied thereto is inserted through the aperture 6 in mounting the case in the instrument board the spring arms 7 fold toward the body of the case until the shoulders 8 at their free ends pass the inner edge of the aperture, whereupon the arms 7 spring outwardly away from the body of the case and engage against the inner wall of the aperture and form a lock for the case to secure and retain the same in place.

A convenient arrangement of retaining device is shown, to which, however, our invention is not to be limited or restricted, wherein the spring arms 7 constitute the free ends of a strap 9, which is applied across the outer surface of the inner end wall 10 of the case 4, and is suitably secured thereto by welding, riveting or otherwise, as indicated at 11.

The top or cap of the instrument, and the mounting of the mechanism (not shown) and of the dial plate and transparent cover, will all depend upon the character of the instrument and these details form no part of our present invention. The annular rim flange 12 at the front end of the case is designed, however, to be supported in suitable manner upon the outer surface of the board 5, at the outer edge of the aperture 6.

Having now set forth the objects and nature of our invention and a construction embodying the principles thereof, what we claim as new and useful, and of our own invention, and desire to secure by Letters Patent is:—

1. In a retaining device for gage and other instrument cases, the combination with a supporting board having an opening therethrough, and a case body to be inserted through said opening, of spring arms secured to that portion of said body which extends through said opening, said arms constructed to engage the inner wall or edge of the opening to retain the case body in position.

2. In a retaining device for gage and other instrument cases, the combination with a supporting board having an opening therethrough, and a case body to be inserted through said opening, of spring arms secured to that portion of said body which extends through said opening, said arms formed with shoulders at their free ends to engage the inner wall or edge of the opening to retain the case body in position.

3. In a retaining device for gage and other instrument cases, the combination with a supporting board having an opening therethrough, and a case body to be inserted through said opening, of spring arms secured to the end wall of that portion of said body which extends through said opening, said arms extending alongside the body toward the outer face thereof, said spring arms being shouldered at their outer free ends to engage against the inner wall of the edge of the opening in the board to retain the body in position.

4. In a retaining device for gage and other instrument cases, the combination with a supporting board having an opening therethrough, and a case body to be inserted through said opening, of a strap secured across the outer surface of the inner end wall of the case body and having its ends bent outwardly and toward the front end of the body and shouldered to engage the inner wall or edge of the opening in the board to retain the body in position.

5. In a retaining structure for gage and other instrument cases, the combination with a supporting member having an opening therethrough, and a case body adapted to be inserted through said opening, said case body having an annular flange at its outer rim to rest against the outer surface of the edge of the said opening, of spring arms attached to that portion of the case body, which extends through said opening, said spring arms being formed with shoulders at their outer ends, and normally held away from the case body, whereby, when the said case body, with the spring arms attached thereto, is inserted through the opening, said shoulders engage the inner surface of the edge of said opening and lock the case body in position with the annular rim flange thereof held against the outer surface of the edge of the opening through said supporting member.

In testimony whereof we have hereunto set our hands on this 30th day of March, A. D. 1920.

CARL H. GRAESSER.
ERNEST B. CROCKER.